United States Patent
Durand et al.

(10) Patent No.: US 10,838,431 B2
(45) Date of Patent: Nov. 17, 2020

(54) AIRCRAFT VERTICAL GUIDANCE

(71) Applicant: THALES, Courbevoie (FR)

(72) Inventors: Geoffrey Durand, Toulouse (FR);
Bertrand Caudron de Coquereaumont, Toulouse (FR); Johan Boyer, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/940,753

(22) Filed: Mar. 29, 2018

(65) Prior Publication Data

US 2018/0284812 A1    Oct. 4, 2018

(30) Foreign Application Priority Data

Mar. 30, 2017    (FR) .................................... 17 00344

(51) Int. Cl.
*G05D 1/06*    (2006.01)
*B64D 45/04*    (2006.01)

(52) U.S. Cl.
CPC ........... *G05D 1/0676* (2013.01); *B64D 45/04* (2013.01)

(58) Field of Classification Search
CPC ............................. G05D 1/0676; B64D 45/04
See application file for complete search history.

(56) References Cited

U.S. PATENT DOCUMENTS

| | | | |
|---|---|---|---|
| 8,954,262 B2 * | 2/2015 | Sawhill | G08G 5/0013 701/122 |
| 9,536,435 B1 * | 1/2017 | Shay | G01W 1/00 |
| 2003/0132860 A1 * | 7/2003 | Feyereisen | G01C 23/00 340/973 |
| 2008/0215196 A1 * | 9/2008 | Deker | G05D 1/0638 701/5 |
| 2015/0323933 A1 | 11/2015 | Darbois et al. | |

FOREIGN PATENT DOCUMENTS

FR    2 845 170 A1    4/2004
FR    3 020 882 A1    11/2015

* cited by examiner

*Primary Examiner* — Peter D Nolan
*Assistant Examiner* — Demetra R Smith-Stewart
(74) *Attorney, Agent, or Firm* — Baker & Hostetler LLP

(57) ABSTRACT

A method implemented by computer for the management of the descent of an aircraft, comprises the steps of: receiving a descent profile; determining a search band comprising a plurality of flight segments of the profile; and selecting a flight segment in the search band. Various selection criteria are described, in particular the consideration of the commands of pitch-up and/or separation with respect to the active segment (anticipation distance). Other developments comprise the fact that the search band is configurable, the consideration of the load factor, modalities of tangent capture (trajectory with no segment crossing), compliance with altitude constraints, the determination of capture parabola modeling the trajectory, as well as the activation of the segment selected as control reference. System aspects and software aspects are described.

17 Claims, 4 Drawing Sheets

AIRCRAFT VERTICAL GUIDANCE

CROSS-REFERENCE TO RELATED APPLICATION

This application claims priority to foreign French patent application No. FR 1700344, filed on Mar. 30, 2017, the disclosure of which is incorporated by reference in its entirety.

FIELD OF THE INVENTION

The invention relates to the technical field of flight management systems, and more particularly to schemes and systems for managing the control by an aircraft of a theoretical descent and approach profile.

BACKGROUND

When flying under automatic vertical guidance, an aircraft is controlled so as to follow a theoretical descent and approach profile termed the TDP profile, calculated by the flight management system (acronym F.M.S.). This profile is made up of segments having various lengths and/or flight path angles (FPA). The descent profile and therefore these segments depend in particular on the aircraft performance and on the procedure selected by the pilot.

In existing flight management systems, the choice of the next segment to be flown by the aircraft is generally made from among a determined list of segments situated ahead of the active or current segment (currently flown by the aircraft). In current systems, the pilot does not intervene in the choice of the segments to be flown. The choice of the segment to control is determined automatically (by the machine, i.e. according to predefined algorithms).

When certain conditions are fulfilled, the chosen (or selected) segment becomes active. By default, guidance of the aircraft continues on the current segment. The conditions to be fulfilled to activate the selected segment may include various parameters, for example and in particular the fact that its "capture" trajectory (actual flight) must be "tangent" (that is to say without crossing the chosen segment to be captured).

Additionally, the selection of the segment which becomes active may take care of i.e. optimize the consideration of the "load factor", so as to keep the latter constant or noticeably constant. The load factor conveys the sensations of weight variations for a human on board the aircraft. The load factor which conveys the force applied to the structure of the aircraft and therefore corresponds to the physical sensations felt by the passengers as the trajectory of the airplane progresses. This load factor can be defined to be the ratio between the total load supported by the structure and the actual weight of this aircraft. The load factor can be expressed as a fraction of gravity (in g). For a load factor greater than one, a thrusting sensation will be felt. For a zero load factor, a sensation of weightlessness will be felt. If the load factor is less than zero, a passenger will have the sensation of being projected upwards (with respect to the ground).

There exists a need to define and ensure optimized vertical guidance, in particular "smoother", according to objective criteria (e.g. tangent approach) and/or subjective criteria (passenger comfort, which is directly or indirectly quantifiable). A technical problem to be solved consists in particular in mastering (e.g. minimizing or optimizing) the deviations or the disparities between the actual trajectory of the aircraft and the theoretical descent profile, in particular during transitions between the various segments of which the TDP profile is composed.

The existing methods show some limitations. The trajectory of the aircraft to travel from one segment to the next must be effected in a manner "tangent" to the TDP segments but also according to an acceptable "load factor". On the one hand, the usual scheme consisting in choosing the next guidance segment from a defined list of segments ahead of the active segment is generally unsuitable. Moreover, this load factor applies globally over the whole capture trajectory but without taking into consideration possible particular geometries between the current point of the aircraft and the so-called point of interception (at which the transition between segments is performed).

The depth of search (e.g. the number of successively selected segments) which conditions a suitable descent is tricky to handle. By ignoring a distant segment, a trajectory decision may turn out to be uncomfortable (pitch-down command followed by a pitch-up command) or indeed unsuitable (tangent capture made impossible or with an excessive load factor) or unsafe (non-compliance with the altitude constraints). The activation of an insufficiently long segment may eventually impede guidance (e.g. reversals of load factors can substantially degrade the aircraft passengers' comfort). The activation of a flight plan segment may ignore or infringe possible constraints, for example as regards altitude.

The patent literature does not explicitly mention any satisfactory solution to the technical problem of vertical guidance with the constraints enumerated hereinabove. In this field of vertical guidance, the literature hardly deals with the aspects of exploration and optimization, for example combinatorial.

SUMMARY OF THE INVENTION

There is described a method implemented by computer for the management of the descent of an aircraft, comprising the steps of: —receiving a descent profile; —determining a search band comprising a plurality of flight segments of the profile; and —selecting a flight segment in said search band. Various selection criteria are described, in particular the consideration of the commands regarding pitch-up and/or separation with respect to the active segment (anticipation distance). Other developments comprise the fact that the search band is configurable, the consideration of the load factor, modalities of tangent capture (trajectory without segment crossing), compliance with altitude constraints, the determination of capture parabola modeling the trajectory, as well as the activation of the segment selected as control reference. System (e.g. FMS, EFB) aspects and software aspects are described.

According to one of the aspects of the method according to the invention, a reference segment is determined so as to determine and/or carry out a suitable control according to a minima "safe" guidance, which is additionally "acceptable" with regard to a set of predefined criteria. "Safe" guidance corresponds for example to the fact of complying with altitude constraints. The guidance can also comply with acceptable regularity criteria (e.g. avoiding stringing together severe changes of directives i.e. load factors, to take care of passenger comfort and/or fuel consumption for example).

According to one of the advantageous aspects of the method according to the invention, there is determined or estimated or evaluated one or more future vertical trajectories of the aircraft, improving the vertical guidance in a general manner, and determining the selection of the segments to be flown in particular. The criteria taken into consideration may in particular comprise the prior verification that the selected segment is in fact flyable and that the associated transition does indeed satisfy predefined altitude constraints (among other parameters).

Advantageously, the method according to the invention makes it possible to master or minimize the altitude deviations in the TDP during flight plan segment transitions.

Advantageously, the method according to the invention makes it possible to anticipate segment captures, therefore inducing "smoother" transitions (e.g. optimized fuel consumption, better passenger comfort).

Advantageously, the method according to the invention makes it possible to filter or to reduce the number of excessively short segments that could complicate the vertical guidance of the aircraft.

BRIEF DESCRIPTION OF THE DRAWINGS

Other characteristics and advantages of the invention will become apparent with the aid of the description which follows and of the figures of the appended drawings in which.

DETAILED DESCRIPTION

Figure 1:
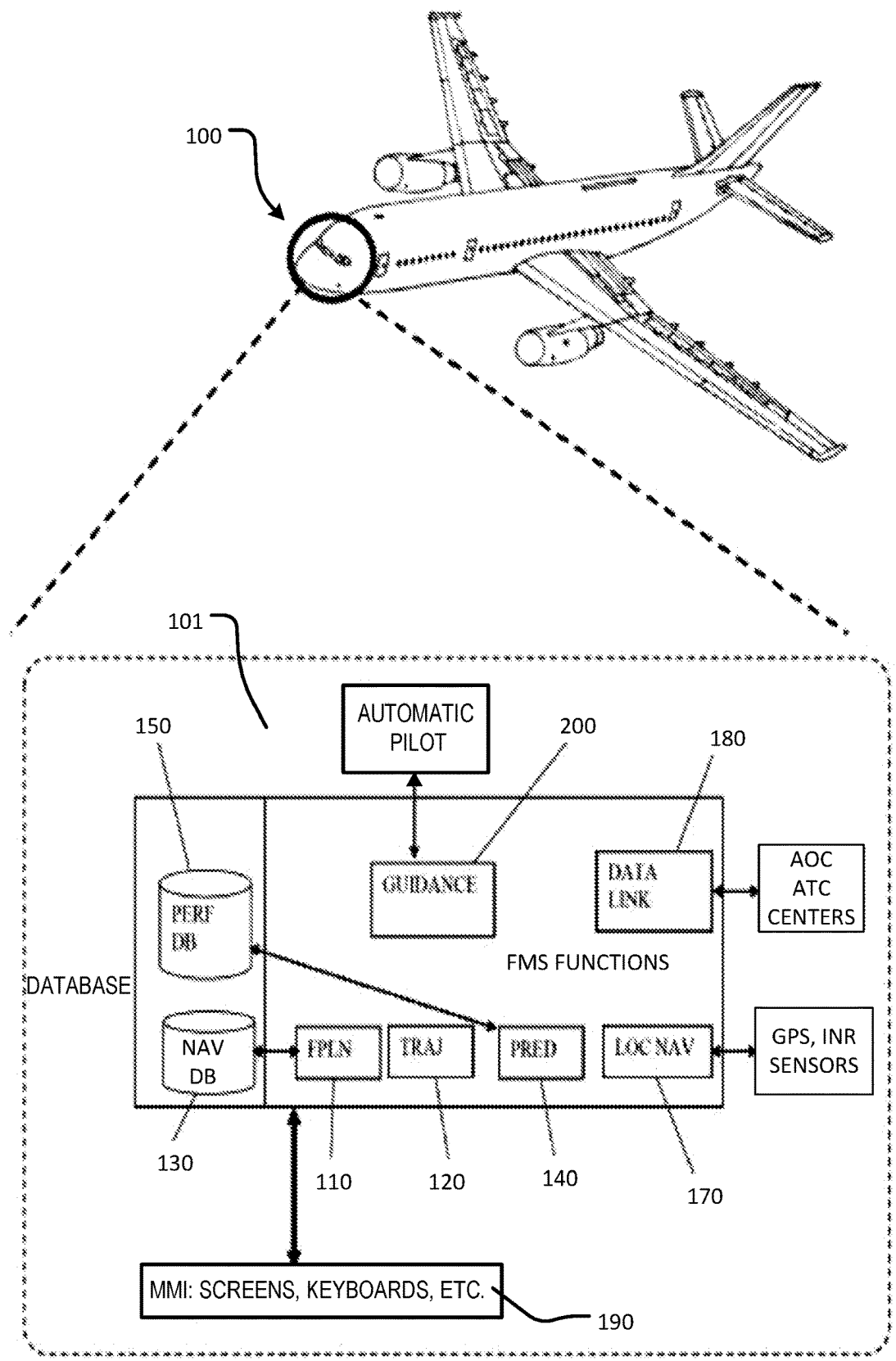
FIG. 1 schematically illustrates the structure and the functions of a flight management system of F.M.S. type on board an aircraft.

FIG. 1 schematically illustrates the structure and the functions of a flight management system of F.M.S. type 101 on board an aircraft 100.

The invention can be integrated into a calculator of FMS type (or into a function FM of a calculator). An F.M.S. 101 is generally connected to numerous other calculators (around a hundred), which can also implement one or more steps of the method according to the invention.

An FMS system generally implements functions or steps described in the ARINC 702 standard (Advanced Flight Management Computer System). These functions comprise in particular:

Navigation LOCNAV, 170, for performing optimal location of the aircraft as a function of the geo-location means (GPS, GALILEO, VHF radio beacons, inertial platforms);
Flight plan FPLN, 110, for inputting the geographical elements constituting the skeleton of the route to be followed (departure and arrival procedures, waypoints, airways);
Navigation database NAVDB 130, for constructing geographical routes and procedures on the basis of data included in the bases (points, beacons, interception legs or altitude legs, etc.);
Performance database, PERF DB 150, containing the craft's aerodynamic and engine parameters.
Lateral trajectory TRAJ, 120: for constructing a continuous trajectory on the basis of the points of the flight plan, complying with aircraft performance levels and with the confinement constraints (RNP);
Predictions PRED, 140: for constructing a speed/altitude profile optimized on the lateral trajectory;
Guidance, GUID 200, for guiding the aircraft on its 3D trajectory in the lateral and vertical planes, while optimizing the speed;
Digital data link DATALINK, 180 for communicating with the control centers and with other aircraft.

On the basis of the flight plan defined by the pilot (list of waypoints), the lateral trajectory is calculated as a function of the geometry between the waypoints (commonly called LEGs) and/or the altitude and speed conditions (which are used for calculating the turning radius).

On this lateral trajectory, the FMS optimizes a vertical trajectory (in altitude and speed), passing through possible altitude, speed, time constraints.

During the descent toward its destination when the airplane is guided in "Managed mode" (that is to say by the FMS), the system must determine the segment of the reference profile to control in terms of vertical guidance.

An F.M.S. system comprises or can be associated with man-machine interfaces M.M.I. 190 (e.g. computer screens, augmented reality, virtual reality, haptic feedback, projectors, etc.). One or more systems (e.g. of non-avionic type) can access the avionic F.M.S., for example via the M.M.I.s 190 and/or through computers 199 of A.O.C. (airline) and/or A.T.C. (air traffic control) type.

There is described a method implemented by computer for the management of the descent of an aircraft, comprising the steps of:—receiving a theoretical trajectory;—determining a search band dimensioned to correspond to the inertial characteristics of the aircraft and/or to satisfy trajectory constraints, said search band comprising one or more segments of the theoretical trajectory.

The method comprises a prior step of receiving (information relating to) a trajectory. The qualifier "theoretical" is illustrative, non-limiting; it may be a trajectory of any type (e.g. published by the air traffic control, a trajectory to be studied, a trajectory corresponding to a flight plan or to a revision of this flight plan, etc.).

The trajectory can be 2D (in two space dimensions, i.e. a vertical profile or even a lateral profile) but also in 3D (trajectory in space, combined lateral/vertical). The trajectory (which is for example "theoretical") is determined by the flight management system FMS and/or received from the air traffic control ATC.

The "search band" determined and manipulated by the invention ensures (cause) or makes it possible (consequence) to contain all the flight (plan) or trajectory segments that can be anticipated with the given constraints (for example taking into account a maximum load factor).

The number of segments in the search band is fixed at a given instant. It may optionally be evaluated dynamically in the course of the flight, since the search band moves with the aircraft.

To determine the search band, the intrinsic characteristics of the aircraft are taken into consideration (the inertial characteristics of the aircraft, such as for example the reactivity of the aircraft, the pitch-up limits etc.), as well as extrinsic characteristics (e.g. constraints which yet further delimit the possible trajectories, for example in terms of passenger comfort). The extrinsic characteristics can be received and/or determined (e.g. calculated, deduced, etc.). The search band therefore delimits the space of the possible, by determining an "envelope" of trajectories, i.e. a "delimitation" or a "window" or a "subset" of the segments of the theoretical trajectory received.

In a development, the method furthermore comprises the step of selecting a segment in the search band.

Within the search band (selection of a subset of segments of the theoretical trajectory received), the selection of a segment is done with the perspective to be controlled shortly, i.e. so as to control the trajectory of the aircraft to this segment (validate in the FMS the flight plan segment, which passes from a status of potential segment to a segment really or actually flown and which therefore restricts the residual space of the possible).

The dimensioning of the search band may be dynamic and within this search band the selection criteria may evolve (statically or in a manner predefined over time, but also dynamically, for example as a function of logical rules, of flight events, of the flight context, etc.).

The objectives underlying the selection may be varied. Corresponding to an aeronautical safety objective, the segment determined as being the most constraining (by internal comparison between the segments) can be selected.

By default or alternatively, the selected segment can be the one which corresponds best (i.e. minimization of the deviation) to the trend of the theoretical trajectory in the search band, with optimization in mind.

In a development, the method furthermore comprises the step of activating the selected segment.

The effective activation of the segment consists in validating said segment in the flight management system. The activated segment will then serve as reference for the effective control.

The instant at which the selected segment will be able to be activated depends on several factors. For example, the segment will be able to be activated at the moment which makes it possible to minimize the deviation from the theoretical trajectory while complying with its constraints, optionally according to a certain tolerance (for example not deviate from the constraints by more than 200 feet) and by considering the inertial characteristics or constraints (the aircraft's capture load factor for example).

Concerning activation: the trajectory of the airplane if the segment is activated is modeled by the FMS. This trajectory is compared with the known or received altitude constraints. If the trajectory is acceptable with regard to the constraints taken into consideration, then the selected segment can actually be activated. If relevant, the aircraft flies the trajectory actually envisaged and verified.

In certain embodiments, precise modeling of the trajectory cannot be performed. Approximations can nonetheless be performed. In particular and for example, an estimation of the trajectory in case of activation may advantageously be "conservative" in relation to altitude constraints (for example a trajectory with a maximum—or on the contrary zero—load factor may be determined so as to identify the extreme situations, knowing that in reality the trajectory will be less constrained).

In a development, the selected segment is a search band flight segment associated with a pitch-up command.

Various ways of selecting a segment may exist, each being able to correspond to different situations. In one embodiment, a selection criterion may be the existence of a pitch-up command. If several pitch-up commands exist within the manipulated search band, it may be advantageous to select the segment associated with the first pitch-up command. However, other selections may be performed (another segment may be selected if it is associated with other parameters leading to a global improvement in trajectory).

If several pitch-up commands are present, the first segment associated with a pitch-up command may be selected.

In a development, the selected segment is the search band's first flight segment associated with a pitch-up command.

This embodiment is advantageous as regards aeronautical safety.

In a development, the selected segment is the first segment exiting said search band.

In other embodiments, the segment furthest from the active segment may be selected (for example the last of the search band, which advantageously makes it possible to avoid directives which are justified in the short term but globally disadvantageous in the longer term).

In a development, the number of flight segments of the search band is configurable.

The "depth" of the search band may be configurable, i.e. vary over time and/or in space. This depth may for example be modified on request by the pilot and/or automatically according to various parameters (for example according to the context or the flight phase, which may turn out to be more or less tricky).

In a development, activation is conditional.

In one embodiment, the method comprises a step of activating the selected flight segment.

This activation may be conditional, as a function of calculated or simulated or estimated or evaluated results. The results or parameters taken into consideration may in particular comprise the degree of satisfaction of predefined criteria by the trajectory of the aircraft once activation is effective. The criteria may in particular relate to the load factor which conveys passenger comfort as the aircraft progresses.

In a development, the activation of the selected segment is conditioned upon the fact that the load factor required for the tangent capture of this segment by the airplane is greater or less than a predefined value.

In one embodiment, the activation of a selected segment is performed when the load factor required for the tangent capture of this segment by the airplane is greater than a predefined value. A tangent capture refers to a trajectory with no crossing of the segment considered.

In one embodiment, the method comprises a step of guiding the aircraft toward the selected flight segment, according to a predefined maximum load factor.

In one embodiment, the predefined load factor may be substantially constant.

In a development, the activation is conditioned upon compliance with one or more previously received altitude constraints.

In one embodiment, the activation of a selected segment is performed when one or more altitudes are complied with (for example those arising on air traffic).

In a development, the method furthermore comprises a step of determining a so-called capture parabola trajectory, said capture parabola modeling the trajectory of the aircraft in the course of the transition following the activation of the selected segment, said activation being performed when the capture parabola ensures that one does not pass at more than a certain predefined value of the altitude of the end on selected segment.

There is described a computer program product, said computer program comprising code instructions making it possible to perform one or more of the steps of the method, when said program is executed on a computer.

There is described a system for implementing one or more of the steps of the method. In one embodiment, the system comprises a flight management system of F.M.S. avionics type. In one embodiment, additionally or instead, the system comprises a non-avionics system of electronic flight bag or E.F.B. type and/or a digital tablet.

Figure 2:
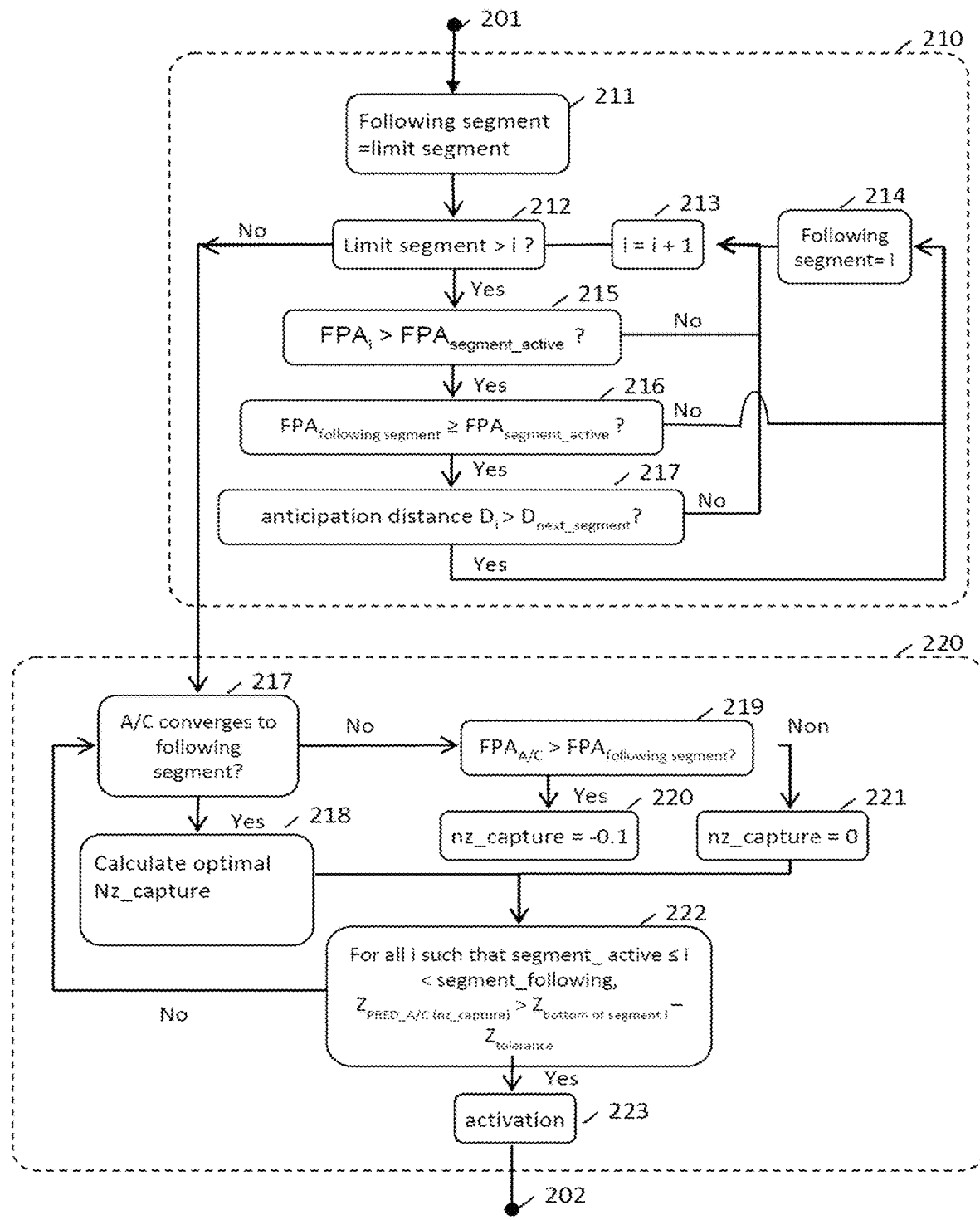
FIG. 2 illustrates examples of steps of the method according to one embodiment of the invention.

FIG. 2 illustrates examples of steps of the method according to one embodiment of the invention.

In one embodiment, the invention can be split into two steps: a step 210 consisting in determining the next segment or "following segment" (to be guided or to be "anticipated") and a step 220 consisting in activating this segment (determination of the instant of activation of this segment).

Step 210 can comprise sub-steps.

The next segment to be guided is sought in a "band" or "search band" or "search space" or "search zone" at the end of the active flight segment (flown by the aircraft). Such a band comprises a plurality of flight segments. The size of the "band" (the number of segments that the band contains) is constructed in such a way that any flight segment that can be captured after the active segment is contained therein.

In this band, i.e. the plurality of selected flight segments, a particular segment termed the "segment to be anticipated" is selected according to criteria defined hereinafter.

If a flight segment included in the band is associated with a pitch-up command, then said segment is selected as segment to be anticipated. Indeed the pitch-up commands contribute to the selection of a segment to be anticipated, for air safety reasons and advantages. If several segments of the "band" are associated with a pitch-up command, the segment that should be activated first for successful capture thereof is selected.

In the absence of such a segment associated with a pitch-up command, the first segment exiting the search band is selected. Stated otherwise, all the "intermediate" segments, i.e. segments included entirely in the band, are ignored. This "lengthening" of the search space advantageously allows improved guidance, by avoiding in particular short-term control of the aircraft to segments that may induce a command that is counter-productive with a view to longer-term control.

Steps 211 to 217 illustrate this selection mechanism. In step 211, the "following segment" (or "next segment") considered is the "limit" segment (last segment of the band). On initialization, segment i is the active segment incremented by 1. The last flight segment is selected (step 212); if a flight segment comprising a pitch-up command exists (Flight Path Angle of the segment less than the active segment FPA>FPActive, then this segment is adopted. If several pitch-up segments exist, the one which is associated with the largest anticipation distance is adopted (217). The anticipation distance generally depends on the delta of angle with the active segment, on the point of intersection with the active segment, on the airplane speed and on the load factor desired during the transition. Between two pitch-up segments, it is therefore the delta of angle with the active segment and the position of the point of interception with the active segment which have an influence (since the other data are identical whatever the segment of the band).

In step 220, the instant (or moment or temporal date) of the activation of the segment to be anticipated (such as determined in the previous step 210) is determined.

The "activation" operation signifies that the segment considered becomes the "reference" for the vertical guidance (i.e. that the system actually controls this segment). Controlling a segment encompasses two aspects: the "capture" of this segment i.e. the fact that the aircraft will be guided to travel along (or join) said segment (with a given target load factor) and the actual guidance control of this segment (during this control, the commanded load factor depends solely on the deviations in relation to the segment).

The previously determined segment is then activated when the following two conditions are fulfilled:

1) the load factor required for the tangent capture of this segment by the airplane is greater than a predefined value. This condition avoids overly long transitions in particular; and 2) the trajectory of the aircraft during capture ensures that one does not pass below an altitude constraint (this constraint being known or received or determined by the FMS or a third-party system). This constraint denoted ALT CSTR may be associated with a given tolerance. Compliance with this condition makes it possible not to stray too far from the theoretical altitude profile ("undershooter").

In one embodiment of the invention, the future dynamics of the aircraft in the course of the transition following the activation of the segment to be anticipated (selected segment) is determined (or calculated or represented or modeled).

If the aircraft converges toward the segment to be anticipated (the selected segment), the deviation in altitude between the aircraft and the segment decreases, then a "capture parabola" modeling the trajectory of an aircraft commanding a given load factor ("optimal Nz_capture") is calculated.

Activation is effective when the capture parabola ensures that one does not pass at more than a certain value of the altitudes of ends of segments.

If the airplane diverges from the segment to be anticipated (the altitude deviation increases) then two cases have to be distinguished according to the direction of the divergence (a) if the aircraft floats above the segment or b) sinks below: test of $FPA_{A/C}$ with respect to the $FPA_{next\_segment}$):

If the airplane flies above the profile, activation is effective when the parabola modeling the trajectory of an aircraft commanding the maximum pitch-down load factor requested by the flight management system ensures that one does not pass at more than a certain value of the altitudes of ends of segments. If relevant, the load factors actually commanded by the system will therefore by definition be lower, thus ensuring that the actual airplane trajectory always complies with the previously verified altitudes (since the aircraft will "pitch-down" less than envisaged).

The step of determining the properties of a capture parabola is performed only if the airplane "converges" (if the airplane diverges, it will bring itself back to the segment without following a particular load factor, naturally according to a "capture" mode).

If the airplane sinks under the profile, activation is effective if the parabola modeling the trajectory of an aircraft commanding a zero load factor ensures that one does not pass at more than a certain value of the altitudes of ends of segments (zero load factor amounts to using the current (present) descent flight path angle of the aircraft). If relevant, the load factors actually commanded by the system will be pitch-up orders (indeed the guidance control leads one to re-converge toward the segment rather than to continue drifting therefrom) thus ensuring that the actual airplane trajectory always complies with the previously verified altitude constraints since the aircraft will pitch-up and will not continue with its current flight path angle.

Figure 3:
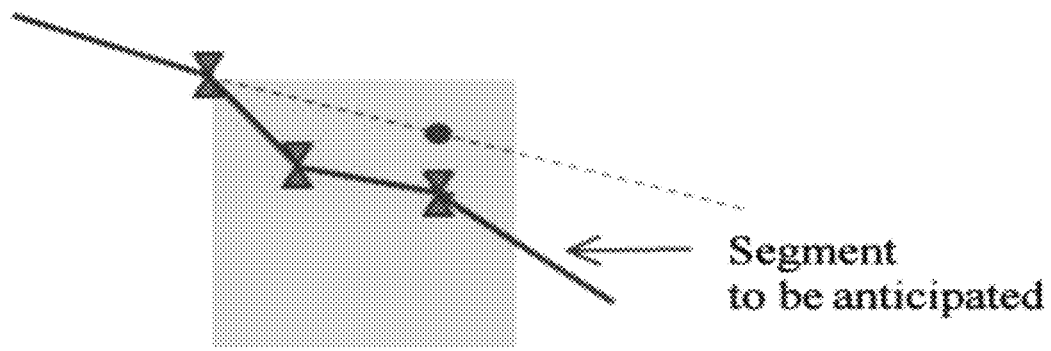
FIGS. 3 to 9 illustrate various examples of descent profiles, such as managed or determined by embodiments of the method according to the invention.
Figure 4:
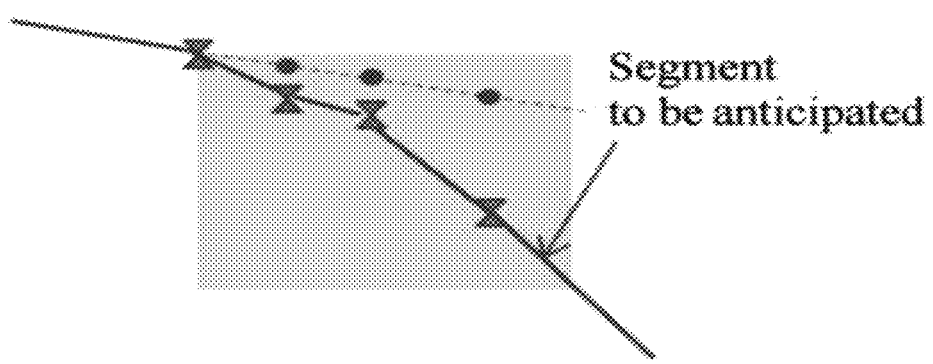
Figure 5:
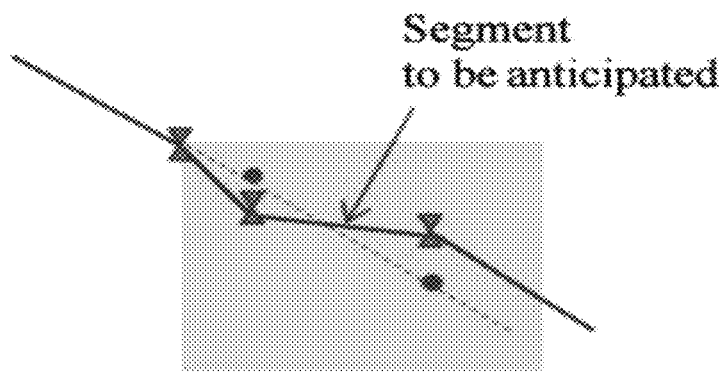

FIGS. 3 and 4 illustrate the choice of a following segment in the search "band".

FIG. 3 illustrates a situation in which there is no risk of passing under a constrained altitude if no anticipation exists. Consequently, the segment exiting the band is adopted as following segment.

FIG. 4 illustrates a situation in which there is passage under a constrained altitude if all the intermediate segments are ignored (a segment will be crossed). Consequently, the segment for which the flight path angle is less than the active one (which risks being crossed) is adopted as the following segment to request a pitch-up command.

FIGS. 5 to 9 illustrate geometries showing the various cases of activation of the following segment.

Figure 6:
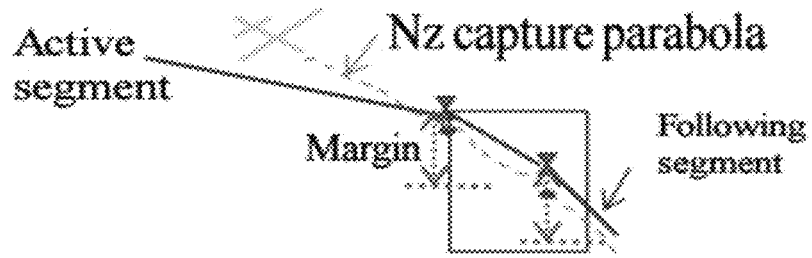
Figure 7:
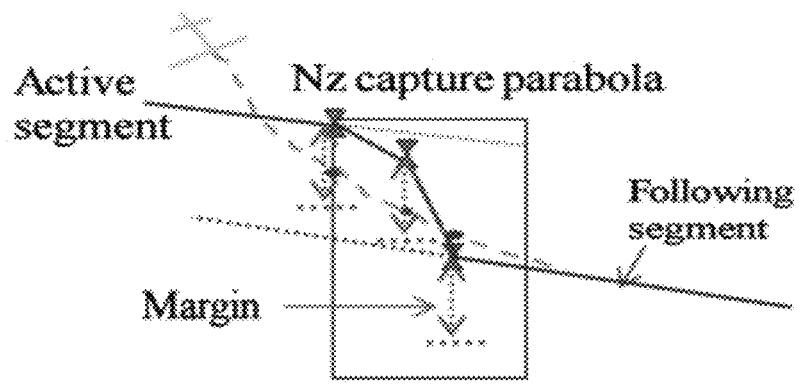

FIGS. 6 and 7 illustrate a situation in which the airplane converges toward the following segment. This segment is activated as soon as the parabola calculated with a given load factor does not pass under the ends of intermediate segments with a margin (that is to say in the diagram if the waypoints are indeed in the margin). As long as this is not the case, the current active segment is kept.

Figure 8:
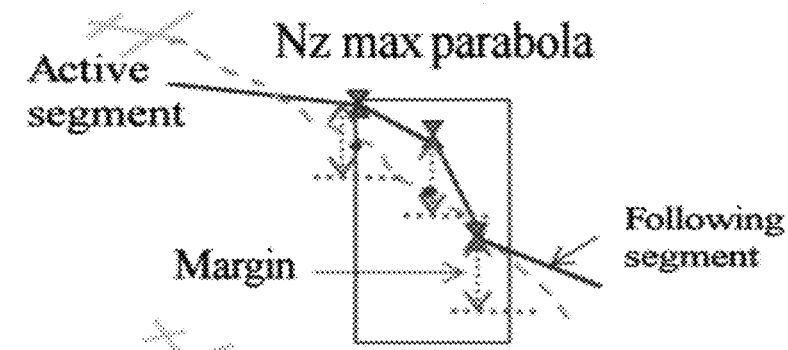

FIG. 8 illustrates a situation in which the airplane diverges upward from the following segment. Here, at its activation, the system will order pitch-down commands so as to re-converge toward the profile. Activating the segment as soon as the parabola calculated with the maximum pitch-down load factor does not pass under the ends of intermediate segments with a margin (that is to say in the diagram if the waypoints are indeed in the margin) is therefore conservative. The "actual" trajectory of the aircraft will be above the green line. As long as this is not the case, the current active segment is kept.

Figure 9:
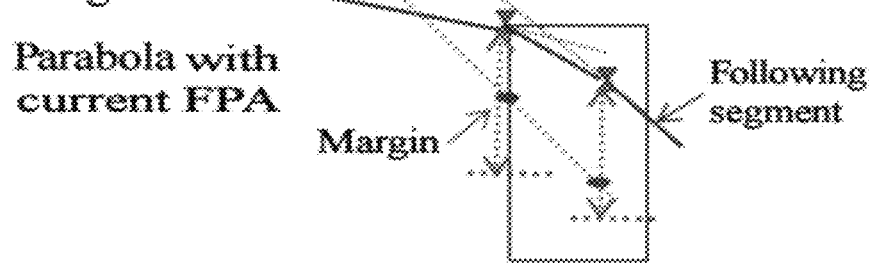

FIG. 9 illustrates a situation in which the airplane diverges downward from the following segment. Here at its activation, the system will order pitch-up commands so as to re-converge toward the profile. Activating the segment as soon as the trajectory based on the airplane flight path angle does not pass under the ends of intermediate segments with a margin (that is to say in the diagram if the waypoints are indeed in the margin) is therefore conservative. The "actual" trajectory of the aircraft will be above the green line. As long as this is not the case, the current active segment is kept.

The invention can be implemented on the basis of hardware elements and/or software elements. In one embodiment, the method is implemented by computer. The invention can be available as a computer program product on a computer-readable medium. The medium may be electronic, magnetic, optical or electromagnetic.

The device implementing one or more of the steps of the method can use one or more dedicated electronic circuits or a general-purpose circuit. The technique of the invention can be carried out on a reprogrammable calculation machine (a processor or a microcontroller for example) executing a program comprising a sequence of instructions, or on a dedicated calculation machine (for example a set of logic gates such as an FPGA or an ASIC, or any other hardware module). A dedicated circuit may in particular speed up performance as regards access and execution of the avionics services. By way of exemplary hardware architecture suitable for implementing the invention, a device may comprise a communication bus to which are linked a microprocessor or central processing unit (CPU), which processor may be "multi-core" or "many-core"; a read-only memory (ROM) able to comprise the programs required for the implementation of the invention; a cache memory or random-access memory (RAM) comprising registers suitable for recording variables and parameters created and modified in the course of the execution of the aforementioned programs; and a communication or I/O ("Input/Output") interface suitable for transmitting and receiving data.

The reference to a computer program which, when it is executed, performs any one of the previously described functions, is not limited to an application program executing on a single host computer. On the contrary, the terms computer program and software are used here in a general sense to refer to any type of computing code (for example application software, micro software, microcode, or any other form of computer instruction) which can be used to program one or more processors to implement aspects of the techniques described here. The computing means or resources may be centralized and/or be distributed ("Cloud computing"), optionally with or according to peer-to-peer and/or virtualization and/or redundancy technologies. The software code can be executed on any appropriate processor (for example, a microprocessor) or processor core or a set of processors, be they provided in a single calculation device or spread among several calculation devices. Security technologies (crypto-processors, authentication—which is optionally biometric, encryption, chip card, etc.) may be used.

In certain embodiments, the various steps of the scheme can be implemented wholly or partly on the FMS and/or on one or more EFBs (electronic flight bags).

The invention claimed is:

1. A method implemented by computer for management of a descent of an aircraft, comprising the steps of:
receiving a theoretical trajectory;
determining a search band dimensioned to correspond to inertial characteristics of the aircraft and/or to satisfy trajectory constraints, said search band comprising one or more segments of the theoretical trajectory; and
selecting a segment in the search band,
wherein a number of flight segments of the search band being configurable; and
said method further comprising a step of activating the selected segment, said step of activating the selected segment triggering guidance of the aircraft, by one of a flight management system of F.M.S. avionics type, an electronic flight bag or E.F.B. type or a digital tablet to send instructions to an automatic pilot to follow the selected segment.

2. The method as claimed in claim 1, wherein the selected segment being a search band flight segment associated with a pitch-up command.

3. The method as claimed in claim 1, wherein the selected segment being the search band's first flight segment associated with a pitch-up command.

4. The method as claimed in claim 1, wherein the selected segment being a first segment exiting said search band.

5. The method as claimed in claim 1, wherein said activation being conditional.

6. The method as claimed in claim 1, wherein the activation of the selected segment being conditioned upon a fact that a load factor required for a tangent capture of this segment by the aircraft is greater or less than a predefined value.

7. The method as claimed in claim 1, wherein said activation being conditioned upon compliance with one or more previously received altitude constraints.

8. The method as claimed in claim 1, further comprising a step of determining a so-called capture parabola trajectory, said capture parabola modeling the trajectory of the aircraft in a course of the transition following the activation of the selected segment, said activation being performed when the capture parabola ensures that one does not pass at more than a certain predefined value of an altitude of the end on selected segment.

9. The method as claimed in claim 1, wherein said segments comprise horizontal segments.

10. The method as claimed in claim 1, wherein said segments comprise longitudinal segments.

11. A computer program product, said computer program product comprising non-transitory code instructions making it possible to perform the steps of the method as claimed in claim 1, when the non-transitory code instructions of said program product are executed on a computer.

12. A system for implementing the steps of the method as claimed in claim 1, comprising a flight management system of F.M.S. avionics type.

13. The system as claimed in claim 12, comprising a non-avionics system of one of the following: an electronic flight bag or E. F. B. type or a digital tablet.

14. A method implemented by computer for management of a descent of an aircraft, comprising the steps of:
receiving a theoretical trajectory;
determining a search band dimensioned to correspond to inertial characteristics of the aircraft and/or to satisfy trajectory constraints, said search band comprising one or more segments of the theoretical trajectory; and
selecting a segment in the search band,
wherein a number of flight segments of the search band being configurable; and
wherein said segments comprise one of the following: horizontal segments or longitudinal segments; and
said method further comprising a step of activating the selected segment, said step of activating the selected segment triggering guidance of the aircraft, by one of a flight management system of F.M.S. avionics type, an electronic flight bag or E.F.B. type or a digital tablet to send instructions to an automatic pilot to follow the selected segment.

15. The method as claimed in claim 14, wherein the selected segment being a search band flight segment associated with a pitch-up command.

16. A computer program product, said computer program product comprising non-transitory code instructions making it possible to perform the steps of the method as claimed in claim 14, when the non-transitory code instructions of said program product are executed on a computer.

17. A system for implementing the steps of the method as claimed in claim 14, comprising of one of the following: a flight management system of F.M.S. avionics type, an electronic flight bag or E.F.B. type or a digital tablet.

* * * * *